United States Patent [19]

Yumiba: Takashi et al.

[11] Patent Number: 5,144,686
[45] Date of Patent: Sep. 1, 1992

[54] MTF COMPENSATION APPARATUS

[75] Inventors: Yumiba: Takashi; Haruo Yamashita, both of Osaka; Shinichi Konishi, Hirakata; Yoshiteru Namoto, Ikoma, all of Japan

[73] Assignee: Matsushita Electric Industrial Co., Ltd., Kadoma, Japan

[21] Appl. No.: 652,076

[22] Filed: Feb. 7, 1991

[30] Foreign Application Priority Data

Feb. 23, 1990 [JP] Japan .................................. 2-43026

[51] Int. Cl.$^5$ ............................................. G06K 9/40
[52] U.S. Cl. ...................................... 382/54; 358/447
[58] Field of Search .................. 382/17, 27, 31, 54; 358/447, 458, 463, 466, 474, 486

[56] References Cited

U.S. PATENT DOCUMENTS

| | | |
|---|---|---|
| 4,163,258 | 7/1979 | Ebihara et al. ........................ 382/54 |
| 4,517,607 | 5/1985 | Ohkouchi et al. .................... 382/54 |
| 4,817,181 | 3/1989 | Kamiya .................................. 382/54 |

OTHER PUBLICATIONS

Mitsuo Kagi, "Image Printing Technology for the Printing and Electrical Engineer", Jun. 15, 1988, 250–257.

Primary Examiner—Jose Couso
Attorney, Agent, or Firm—Cushman, Darby & Cushman

[57] ABSTRACT

In a picture processing apparatus, respective results of subtraction calculation between the relevant pixel and the reference pixels are obtained by a subtraction arithmetic circuit. The resultant differences are converted nonlinearly by a nonlinear conversion circuit, and thereafter a summation calculation of these resultant differences are performed by a first addition arithmetic circuit. The obtained result is added to data of the relevant pixel by a second addition arithmetic circuit; thereby achieving MTF correction. By adequately selecting the input-output characteristic of the nonlinear conversion circuit, a stable contour line enhancement is achievable even when noise is present in the picture signal.

11 Claims, 16 Drawing Sheets

FIG. 1

|  | D(i, j-1) |  |
|---|---|---|
| D(i-1, j) | D(i, j) | D(i+1, j) |
|  | D(i, j+1) |  |

(a) An example of processing by prior art
(b) Correction
Noise

FIG. 8 An example of processing by the present invention

| 230 | 230 | 230 | 230 | 230 | 230 | 180 |
| --- | --- | --- | --- | --- | --- | --- |
| 230 | 230 | 230 | 230 | 230 | 190 | 230 |
| 230 | 230 | 230 | 230 | 200 | 230 | 230 |
| 230 | 230 | 220 | 210 | 230 | 230 | 230 |
| 230 | 230 | 230 | 230 | 230 | 230 | 230 |
| 230 | 230 | 230 | 230 | 230 | 230 | 230 |
| 230 | 230 | 230 | 230 | 230 | 230 | 230 |

↑ Correction (b)

| | | | | | | |
| --- | --- | --- | --- | --- | --- | --- |
| | 170 | 239 | 230 | 230 | 230 | |
| | 239 | 185 | 234 | 230 | 230 | |
| | 230 | 234 | 210 | 230 | 230 | |
| | 230 | 230 | 230 | 220 | 230 | |
| | 230 | 230 | 230 | 230 | 230 | |
| | | | | | | |

An example of processing by prior art

| 180 | 180 | 180 | 180 | 180 | 180 | 180 |
|-----|-----|-----|-----|-----|-----|-----|
| 30  | 180 | 180 | 180 | 180 | 180 | 180 |
| 180 | 30  | 180 | 180 | 180 | 180 | 180 |
| 180 | 180 | 30  | 180 | 180 | 180 | 180 |
| 180 | 180 | 180 | 30  | 180 | 180 | 180 |
| 180 | 180 | 180 | 180 | 30  | 180 | 180 |
| 180 | 180 | 180 | 180 | 180 | 30  | 180 |
| 180 | 180 | 180 | 180 | 180 | 180 | 180 |

↓ Correction (b)

|   |     |     |     |     |     |   |
|---|-----|-----|-----|-----|-----|---|
|   | 200 | 180 | 180 | 180 | 180 |   |
|   | 0   | 200 | 180 | 180 | 180 |   |
|   | 200 | 0   | 200 | 180 | 180 |   |
|   | 180 | 200 | 0   | 200 | 180 |   |
|   | 180 | 180 | 200 | 0   | 200 |   |
|   |     |     |     |     |     |   |

An example of processing by the present invention

| 180 | 180 | 180 | 180 | 180 | 180 | 180 |
|---|---|---|---|---|---|---|
| 30 | 180 | 180 | 180 | 180 | 180 | 180 |
| 180 | 30 | 180 | 180 | 180 | 180 | 180 |
| 180 | 180 | 30 | 180 | 180 | 180 | 180 |
| 180 | 180 | 180 | 30 | 180 | 180 | 180 |
| 180 | 180 | 180 | 180 | 30 | 180 | 180 |
| 180 | 180 | 180 | 180 | 180 | 30 | 180 |

↑ Correction (b)

| | | | | | | |
|---|---|---|---|---|---|---|
| | 220 | 180 | 180 | 180 | 180 | |
| | 0 | 220 | 180 | 180 | 180 | |
| | 220 | 0 | 220 | 180 | 180 | |
| | 180 | 220 | 0 | 220 | 180 | |
| | 180 | 180 | 220 | 0 | 220 | |
| | | | | | | |

An example of processing by prior art

| 230 | 230 | 230 | 230 | 230 | 230 | 230 |
|---|---|---|---|---|---|---|
| 230 | 230 | 230 | 230 | 230 | 230 | 160 |
| 230 | 230 | 230 | 230 | 230 | 160 | 230 |
| 230 | 230 | 230 | 230 | 160 | 230 | 230 |
| 230 | 230 | 230 | 160 | 230 | 215 | 230 |
| 230 | 230 | 160 | 230 | 215 | 230 | 230 |
| 230 | 160 | 230 | 230 | 230 | 230 | 230 |
| 230 | 230 | 230 | 230 | 230 | 230 | 230 |

Noise

↓ Correction

(b)

|  |  |  |  |  |  |  |
|---|---|---|---|---|---|---|
|  | 230 | 230 | 240 | 140 | 238 |  |
|  | 230 | 240 | 140 | 236 | 223 |  |
|  | 240 | 140 | 238 | 223 | 226 |  |
|  | 140 | 240 | 230 | 228 | 230 |  |
|  | 240 | 230 | 230 | 230 | 230 |  |
|  |  |  |  |  |  |  |

An example of processing by the present invention

FIG. 15 An example of processing by prior art

5,144,686

MTF COMPENSATION APPARATUS

FIELD OF THE INVENTION AND RELATED ART STATEMENT

1. Field of the Invention

The present invention relates to a picture processing apparatus using a Laplacian filtering scheme which is one of spatial filtering techniques used for making a defocused image picture sharper.

2. Description of the Related Art

In general, it is well known that, in a reader section of a digital copier or in a facsimile apparatus, defocused images take place due to a possible degradation in the MTF (Modulation Transfer Function) of lenses or sensors used therein.

Heretofore, in conventional picture processing apparatus as shown in "Image Printing Technology for the Printing and Electrical Engineer" by Mitsuo Kagi, in order to correct these defocused images in a picture, a spatial filtering process called the Laplacian filtering technique is applied. This technique utilizes the Laplacian components of second derivatives of picture data, and thereby the degradations in the MTF are corrected, so as to sharpen reproduced pictures.

This spatial filtering process is elucidated below. Defocused images in pictures are basically caused by possible lowerings of high-frequency components of the spatial frequencies of picture images due to imperfections of the MTF characteristics. Therefore, the spatial filtering processing is carried out by enhancing the data of relevant pixels by utilizing the data of a plurality of reference pixels in the vicinity of those relevant pixels. Namely, an amount of correction is determined from a difference between a datum of the relevant pixel and a sum of data of pixels in the vicinity of the relevant pixel. That is, the amount of correction is determined from the Laplacian component of the second derivatives which expresses the contour lines of the picture image. The correction is achieved by adding this correction value to the data of the relevant pixel.

FIG. 1 is a schematic drawing illustrating the conventional spatial filtering scheme. Wherein $D(i,j)$ represents a datum of a relevant pixel, whereas $D(i-1,j)$, $D(i+1,j)$, $D(i,j-1)$, and $D(i,j+1)$ represent data of reference pixels. At this time, the MTF correction processing utilizing the Laplacian filtering is expressed by the following equation;

$$D'(i,j) = D(i,j) + \alpha \cdot S(i,j) \quad (1)$$

where
$\alpha$: constant coefficient $$S(i,j) = 4 \times D(i,j) - \Sigma D(1+k, j+l),$$

when $k=0$ $l=\pm 1$,
when $l=0$ $k=\pm 1$.

In general, when such the MTF correction was applied, noises existing in areas wherein the density distribution is flat were also enhanced and hence the S/N ratio was degraded. Thus this correction procedure eventually produces a picture which gives a noisy feeling. For solving this difficulty, an improved scheme had already been proposed that, when an absolute value of a difference between the datum of the relevant pixel and a sum of the data of pixels in the nearest neighbor to the relevant pixel is less than a specified value (TH), the correction shown by the equation (1) is done by making the addition calculation in the equation (1) by setting the coefficient $\alpha$ appearing in the equation (1) to be 0, that is, by making no MTF correction.

In accordance with the constitution such as described above, however, a problem is left to be solved. The problem is that, (i) when the noise level in the flat portion of the density distribution of a picture is less than the above-mentioned specified value, influence of noise is not certainly included in the relevant pixels, (ii) however, when a contour line and noise are included at the same time in the relevant pixel or reference pixels, and also as a result of this, the difference between the datum of the relevant pixel and a sum of the data of nearest-neighboring reference pixels exceeds a specified value, influence of noise is eventually included in the corrected datum of the relevant pixel. In such circumstances, there arises an inconvenience that, even for a contour line which is expected to be a smooth line of constant density, level variation is to be include.

Furthermore, there is another inconvenience as follows: when the absolute value of the difference between the datum of the relevant pixel and the sum of the data of pixels in the nearest neighbor to the relevant pixel is less than a specified value, the corrected value $\alpha \cdot S(i,j)$ is set to 0. Therefore, for cases such that the level of the contour line varies gradually from a high level to a low level, the enhancement process stops after the level becomes below a certain value, and the continuity of contour lines is interrupted.

And, in the conventional prior art, only one common coefficient $\alpha$ was equally used for both those areas wherein the level difference is large and also for those areas wherein the level difference is small. This also gives another inconvenience that contour lines are enhanced excessively in those areas wherein the level difference on the contour line is large.

Furthermore, there is still another inconvenience. That is, although low-level noises in the high frequency range of the spatial frequency are certainly not enhanced, these noises are to appear on the picture without receiving any correction.

Object and Summary of the Invention

The purpose of this invention is to offer a picture processing apparatus wherein the noise of pictures due to the influence of noise included in the relevant pixel as well as in the reference pixels can be reduced.

According to the picture processing apparatus of the present invention, on contour lines on which the level varies gradually, the contour line enhancement processing can be applied keeping the continuity of these contour lines.

Furthermore, according to the picture processing apparatus of the present invention, the MTF correction can be made so as to accurately respond to the level variations of the contour lines in the picture image signals which were before the correction.

Furthermore, according to the picture processing apparatus of the present invention, low-level noise components in the high frequency range are smoothed out, and thereby the noise of the picture can be reduced.

BRIEF EXPLANATION OF THE DRAWINGS

FIG. 1 is an explanatory drawing of a matrix of a spatial filtering scheme.

FIGS. 9a and 9b are an example of explanatory table of data corresponding to those of FIG. 8 but processed by the prior art.

FIGS. 11a and 11b are an example of explanatory tables of results processed by the third embodiment of the present invention.

FIGS. 12a and 12b are an example of explanatory table of data corresponding to those of FIG. 11 but processed by the prior art.

FIGS. 14a and 14b are an example of the explanatory tables of results processed by the fourth embodiment of the present invention.

DESCRIPTION OF THE PREFERRED EMBODIMENTS

Figure 2:
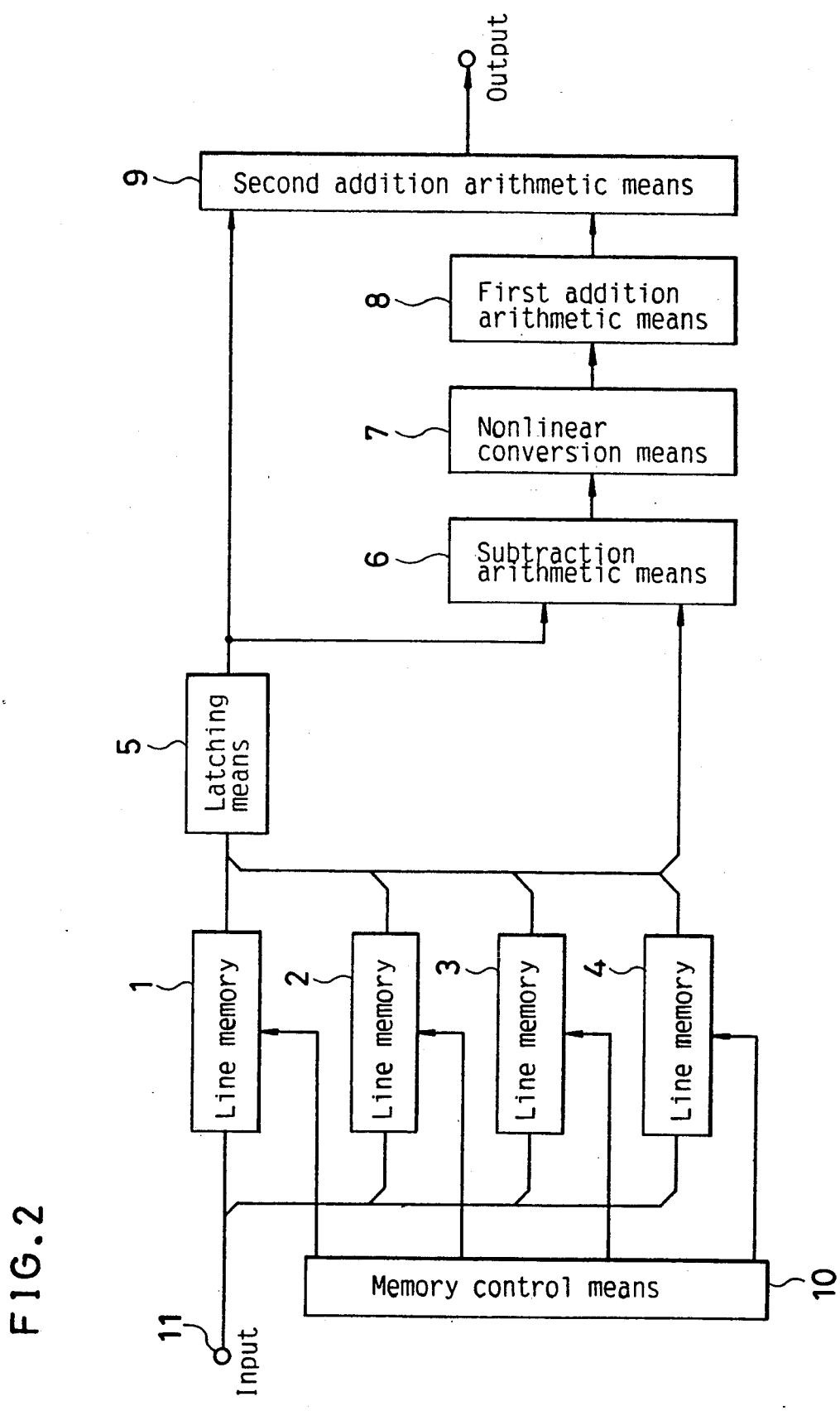
FIG. 2 is a block diagram of a logic processing apparatus in a first embodiment of the present invention.

The present invention is to offer a picture processing apparatus through which a smooth MTF correction on defocused images on a picture is achievable by enhancing stably contour lines included in the picture as well as by eliminating the noise of the picture without being influenced by the presence of noise.

In order to solve the above-mentioned problems, the picture processing apparatus of the present invention comprises: subtraction arithmetic means by which the data of N (N is an integer $\geq 1$) reference pixels in the nearest neighbor to the relevant pixel are respectively subtracted from a datum of the relevant pixel, nonlinear conversion means which applies the nonlinear conversion on those respective outputs of this subtraction arithmetic means, first addition arithmetic means by which respective outputs of the above nonlinear conversion means are summed up, and second addition arithmetic means by which the data of the relevant pixel and the output of the above-mentioned first addition arithmetic means are added to each other.

According to the apparatus described above, the data of respective reference pixels are subtracted from the datum of a relevant pixel, then those respective results are nonlinearly converted by a nonlinear conversion means, and by adding the output thereof again to the datum of the relevant pixel the subtracted result between the datum of the relevant pixel having noise and the data of the reference pixels is made to be zero, and thereby the MTF correction is achieved.

And according to the apparatus described above, after nonlinearly converting respective results of subtraction calculation between the relevant pixel and the reference pixels, summation calculation of these results are performed, then the result thereof is added to the relevant pixel, thus the MTF correction is achieved. By the process described above, even in such a case that the contour lines and noise are present at the same time in the relevant pixel and/or the reference pixels, it becomes possible to perform a stable contour line enhancement in conjunction with an elimination of the effect of noise.

And a variation mode of the embodiment of the present invention has, besides the above-mentioned configuration, such feature that the input characteristic of the nonlinear conversion means is continuous, and when the absolute value of the input is less than a first threshold value, the output becomes zero, whereas when the absolute value of the input is greater than the first threshold value, it becomes a monotonously increasing function and in addition to that the increment of its slope with respect to the increase of the absolute value of the input, at least, does not become negative.

According to the variation mode of the embodiment described above, responding to the difference between the relevant pixel and the reference pixels, that is, responding to the Laplacian component which is the second order derivative of the picture image, then referring to a nonlinear conversion means having a nonlinear conversion characteristic whose input-output characteristic is continuous, and when the absolute value of the input is less than a specified value, its output becomes zero, whereas when it is greater than the specified value, it is expressed by a monotonously increasing function, and by adding this result to the datum of the relevant pixel, the MTF correction is achieved.

By means of performing the MTF correction employing a nonlinear conversion means that the input-output characteristic is continuous and when the absolute value of the input is less than the first threshold value, the output is zero, whereas when the absolute value of the input is greater than the first threshold value, it is a monotonously increasing function, and the increment of its slope with respect to the increase of the absolute value of the input, at least, does not become to be negative, without enhancing the noise components and also without introducing any interruption on the contour lines, a smooth continuous contour lines can be obtained.

And a further modified embodiment of the present invention is characterized in that the input-output characteristic of the nonlinear conversion means is continuous, and when the absolute value of the input is greater than a second threshold value which is greater than the first threshold value, its slope is smaller than a slope in a range in which the absolute value of the input is less than the second threshold value.

According to the further modified embodiment described above, referring to a nonlinear conversion means by which areas wherein the difference between the relevant pixel and the reference pixels, that is, the Laplacian component which is the second order derivative of the picture image, is greater than a specified value have a lower correction value in comparison with that of rest areas, an arithmetically processed result is referred, and by adding this result to the datum of the relevant picture element, the MTF correction is achieved.

And according to the above-mentioned further modified embodiment, in case its slope is smaller than a maximum slope in a range in which the absolute value of the input is less than the second threshold value, when the absolute value of the input is greater than the second threshold value, the MTF correction which is suitable for the level difference on the contour lines can be achieved. The MTF correction can be made by decreasing amount of correction in case the level differences between adjacent pixels before performing the correction are large, (that is, in case the level differences on contour lines are large.)

And, a still further modified embodiment of the present invention is characterized in that the input-output characteristic of the nonlinear conversion means is continuous, and when the absolute value of the input is less than a third threshold value which is less than the first threshold value, it is expressed by a monotonously decreasing function.

According to the above-mentioned still further modified embodiment of the present invention a nonlinear conversion means by which, when the Laplacian component which is the second order derivative of the picture image is less than a specified value, a smoothing process is performed, whereas when it is greater than a specified value, an enhancement process is performed, is referenced from an arithmetically processed result between the relevant pixel and the reference pixels, and by adding this result to the datum of the relevant picture element, the MTF correction is achieved.

By making the input-output characteristic of the nonlinear conversion means continuous and being able to be expressed by a monotonously increasing function when the absolute value of the input is less than the third threshold value, the low-level noise components in the high frequency range is smoothed out, thereby a picture image in which the noise is eliminated and only the contour lines are enhanced is obtainable. Thus the effect in its practical application usage is great.

FIRST EMBODIMENT

FIG. 2 shows a block diagram of a picture processing apparatus of a first embodiment of the present invention. In FIG. 2, numerals 1 to 4 are line memories which memorize picture image signal of an amount of as much as one line; numeral 5 is latching means which keeps data of a relevant pixel given from the line memory 1, 2, 3 or 4; numeral 6 is subtraction arithmetic means which performs subtraction calculation of data of four reference pixels from the data of the relevant pixel kept in the latching means 5; numeral 7 is nonlinear conversion means which performs nonlinear conversions, to be described later, on the output of the subtraction arithmetic means 6 and is constituted by a table memory using a ROM in the present embodiment. Numeral 8 is first addition arithmetic means which performs successive addition calculations of outputs of the nonlinear conversion means 7; numeral 9 is second addition arithmetic means which performs an addition calculation between the output of the first addition arithmetic means 8 and the output of the latching means 5; and numeral 10 is a memory control means which controls line memories 1, 2, 3, and 4.

The latching means 5, subtraction arithmetic means 6, non-linear conversion means 7, first and second addition arithmetic means 8 and 9, memory control means 10 may be constituted by hard circuits, but at least some of them may be constituted by known microcomputer functions.

Figure 3:
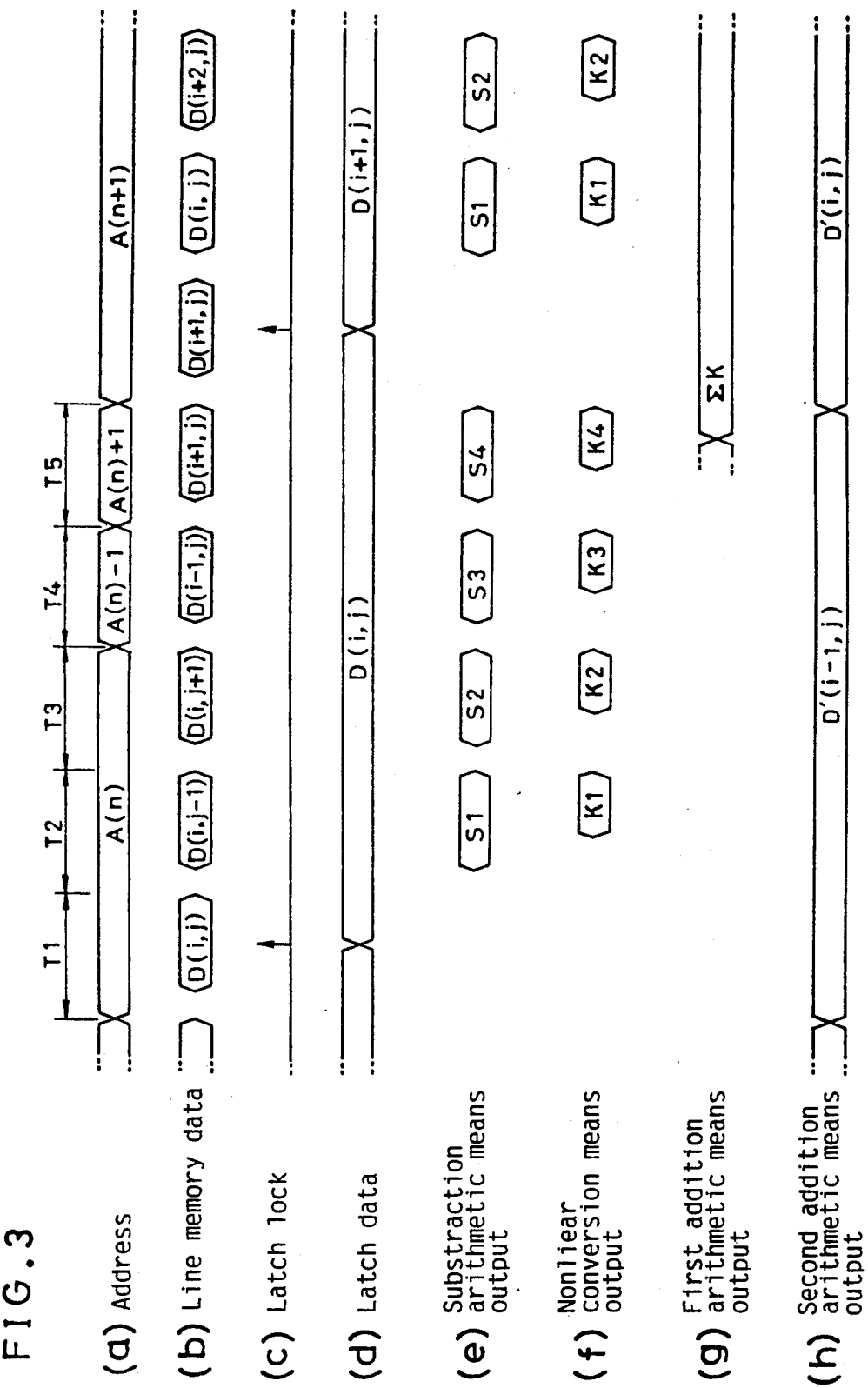
FIGS. 3a-3h comprise a timing chart for explaining the operation of the first embodiment of the present invention.

The operation of the picture processing apparatus of the above-mentioned first embodiment is elucidated below. FIG. 3 is a timing chart for explaining the first embodiment in the present invention.

Figure 1:
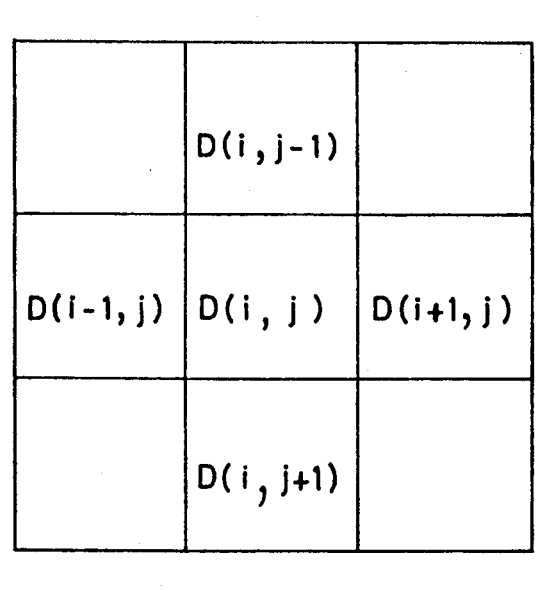

In the present embodiment, size or scale of the matrix of a spatial filter is selected to be $3 \times 3$. The designation convention of elements of this matrix is shown in FIG. 1. That is, datum of a relevant pixel $P(i,j)$ is designated as $D(i,j)$, and data of reference pixels $P(i-1,j)$, $P(i+1,j)$, $P(i,j-1)$ and $P(i,j+1)$ are designated as $D(i-1,j)$, $D(i+1,j)$, $D(i,j-1)$ and $D(i,j+1)$.

By setting one of four line memories 1 to 4 in write-in state, by control of the memory control means 10, data of each one line of the picture image signals, which are issued from such as an image reader (not shown in the figure), are successively written into the selected one of the four line memories 1 to 4. At this time, an identical address is given to those four line memories by the memory control means 10. Every time after completing the writing-in action of one line, these write-in line memories are successively switched over to the next ones and thus the writing-in actions are repeated in turn. That is, for example, when data on $(n+2)$-th line are written in the line memory 4, data on $(n-1)$-th line into the line memory 1, data on n-th line into the line memory 2, and data on $(n+1)$-th line into the line memory 3, have been written in and are memorized, respectively.

For example, now let us assume a case that the line memory 4 is being used as for a write-in memory. At this time, the line memory whereof the datum $D(i,j)$ of the relevant or considered pixel $P(i,j)$ is stored in the line memory 2. On the other hand, the datum $D(i,j)$ of the reference pixel $P(i,j)$ is stored in the line memory 2, the data $D(i-1,j)$ and $D(i+1,j)$ of the reference pixels $P(i-1,j)$ and $P(i+1,j)$ are stored in the line memory 2, and the datum $D(i,j+1)$ of the reference pixel $P(i,j+1)$ is stored in the line memory 3, respectively.

As is shown in FIG. 3, during the T1 cycle, a read-out action is carried out only on the line memory 2. That is, the datum $D(i,j)$ of the relevant pixel $P(i,j)$ is read out from the memory 2 and it is held by the latching means 5.

Then during the T2 cycle, keeping the address of the T1 cycle, a read-out of the line memory 1 only is carried out and the datum $D(i,j-1)$ of the reference pixel $P(i,j-1)$ is read out from the line memory 1. A subtraction calculation between the data $D(i,j)$ of the relevant pixel $P(i,j)$ held by the latching means 5 and data $D(i,j-1)$ of the reference pixel $P(i,j-1)$ is carried out to obtain a difference output S1 (that is, $S1=D(i,j)--D(i,j-1)$) by the subtraction arithmetic means 6. Then, in reference to the nonlinear conversion means 7 with this difference output S1, an output K1 is obtained.

During the T3 cycle, read out of the line memory 3 is carried out and the datum $D(i,j+1)$ of the reference pixel $P(i,j+1)$ is read out, and a subtraction calculation between the data $D(i,j)$ of the relevant pixel $P(i,j)$ held by the latching means 5 and data $D(i,j+1)$ of the reference pixel $P(i,j+1)$ is carried out (that is, $S2=D(i,j)--D(i,j+1)$) by the subtraction arithmetic means 6. Then, in reference to the nonlinear conversion means 7 with this output, an output K2 is obtained.

This output K2 and the afore-mentioned output K1 is added to each other by the first addition arithmetic means. Also for the subsequent steps, similar processes are applied, and thereby the subtraction between the relevant picture element and the reference pixels is repeated. And the resultant outputs of from K1 up to K4 are successively summed up.

Thereafter, the data D(i,j) of the relevant pixel P(i,j) and an output of the first addition arithmetic means are added to each other by the similar second addition arithmetic means, thereby to obtain an MTF-corrected picture image data D'(i,j).

Hereupon, the input-output characteristic of the nonlinear conversion means 7 is elucidated below.

The MTF correction process of the present invention can be expressed by the following equation (2).

$$D'(i,j) = D(i,j) + S'(i,j) \quad (2),$$

where $$S'(i,j) = \Sigma S'_n (n = 1, 2, 3, 4)$$

and $$S'_1 = \alpha \cdot (D(i,j) - D(i-1,j)),$$

$$S'_2 = \alpha \cdot (D(i,j) - D(i+1,j)),$$

$$S'_3 = \alpha \cdot (D(i,j) - D(i,j-1)),$$

$$S'_4 = \alpha \cdot (D(i,j) - D(i,j+1)).$$

Hereafter, FIGS. 5a and 5b, FIGS. 8a and 8b, and FIGS. 11a and 11b show examples of the states of data of pixels before and after the processings using the nonlinear conversion means 7, whereby various input-output characteristics in accordance with the present embodiment and other respective embodiments are processed. Also, examples using conventional schemes corresponding respectively to the above embodiments are shown in FIGS. 6a and 6b, FIGS. 9a and 9b, and FIGS. 12a and 12b. These figures illustrate parts of whole picture images. In these figures, figures (a) represent partial picture images to be processed, while figures (b) represent partial picture images after processings, respectively. Respective picture image data are assumed to be represented by 8 bits. Those pixels aligning along inside the periphery in figures (b) are left blank, because these pixels require, to be filled, based on data outside the periphery of the picture image of figures (a), which are not given.

Figure 4:
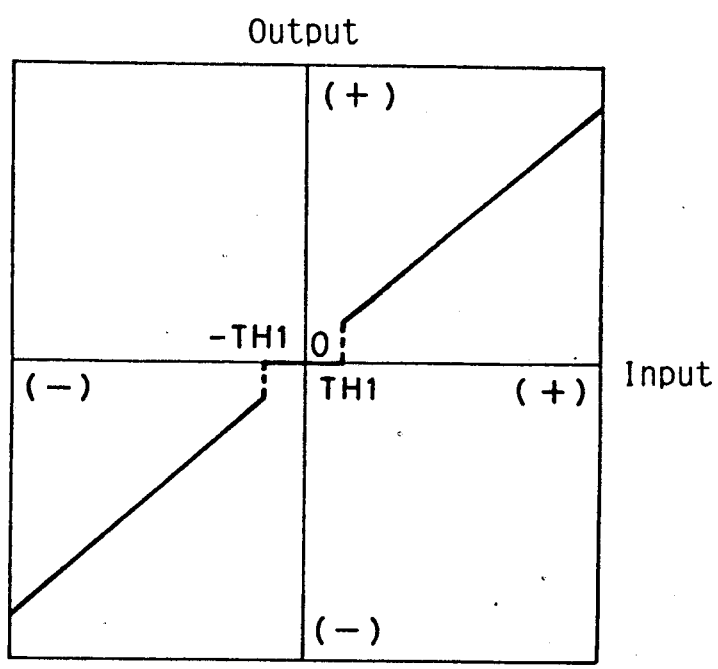
FIG. 4 is an input-output characteristic of a nonlinear conversion means in the first embodiment of the present invention.

FIG. 4 is a characteristic curve showing an input-output characteristic of the nonlinear conversion means 7 of the present embodiment of the present invention. On the abscissa, the output of the subtraction arithmetic means 6, that is, the resultant difference of a subtraction of the data of reference pixels from the datum of the relevant pixel is taken, and on the ordinate the output S'$_n$ is taken, respectively.

In a matrix size as shown in FIG. 1, those resultant differences between the adjacent pixels, give high frequency components. Hence, components of relatively low levels among these high frequency range components may be mostly of noise. Therefore, in the present embodiment, the input-output characteristic of the nonlinear conversion means 7 is determined in a manner that, when the absolute value of the input is less than a specified threshold value (TH1) the output is zero, whereas when the absolute value of the input is greater than the threshold value (TH1), the input-output characteristic becomes $\gamma = \alpha \cdot x$ (where $\alpha > 0$). The above-mentioned determination is expressed in inequities as follows;

$$\begin{rcases} \text{(a) when } |Si| \leq TH1, ki = 0 \\ \text{(b) when } TH1 < |Si|, ki = \alpha \cdot Si \, (\alpha > 0) \end{rcases} \quad (3)$$

where Si is the resultant difference of the substraction.

Figure 5:
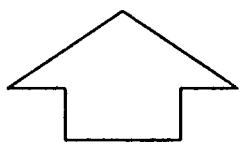
FIGS. 5a and 5b are an example of explanatory table of data results processed by the first embodiment of the present invention.
Figure 6:
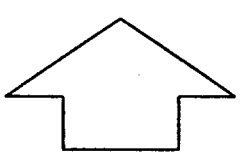
FIGS. 6a and 6b are an example of explanatory table of data corresponding to those of FIG. 5 but processed by the prior art.

Examples of the processed results of the present first embodiment using the nonlinear conversion means 7 having the input-output characteristic described above is shown in FIG. 5. In FIG. 5, (a) illustrates picture image data before the correction, and (b) picture image data after the correction, as mentioned before. Here, it is assumed that $|TH1| = 15$ and $\alpha = 0.125$. An example of processed results of a conventional scheme is shown in FIG. 6. Here, in order to keep the condition to be identical with the present embodiment, $|TH1| = 60$ and $\alpha = 0.125$ are assumed. In those picture image data before the correction of FIG. 5(a) and FIG. 6(a), pixels having a level of 215 represent noises, and pixels having a level of 160 represent a gray contour line, and pixels having a level of 230 represent white flat area.

Comparison between FIG. 5 and FIG. 6 reveals the followings. When a contour line and noise are present at the same time in the relevant pixel or reference pixels of a spatial filter matrix under consideration, the conventional scheme of FIG. 6 has the inconvenience that those pixels adjacent to the contour line, whose levels are originally expected to be constant, make undesirable level changes. On the other hand, in the present invention, data of those pixels adjacent to the contour line keep a constant level.

Apart from the present embodiment wherein the nonlinear conversion means 7 has been taken to be a memory table using a ROM, a certain other scheme can be employed such that: by selecting a correction factor (in the present embodiment, 0 or $\alpha$) responding to the subtraction result (difference) between the relevant pixel and the reference pixels, an amount of correction is obtained by multiplication by the selected correction factor.

As has been explained above, according to the present embodiment, even when the contour lines as well as noise are present at the same time in the relevant pixel and/or in the reference pixels which are inside the spatial filter matrix, a stable MTF correction without influence of noise can be achieved with a simple constitution.

SECOND EMBODIMENT

Figure 7:
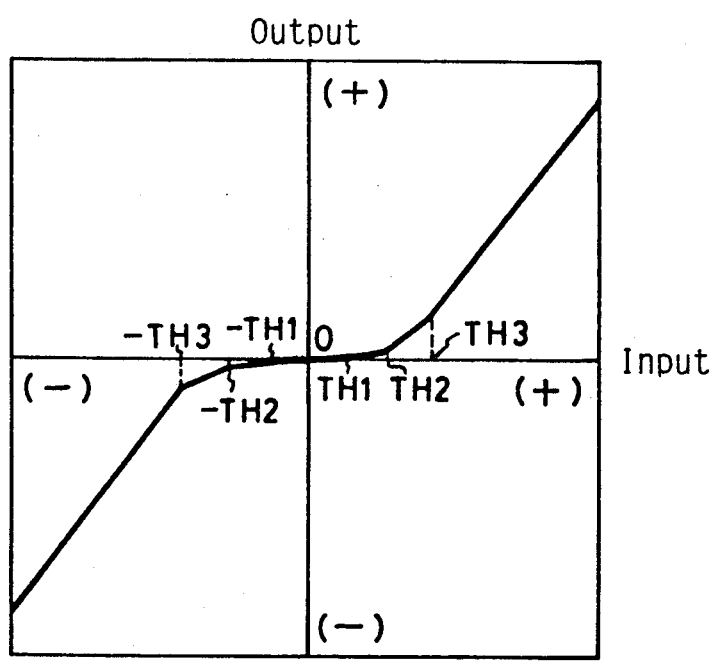
FIG. 7 is an input-output characteristic of a nonlinear conversion means in a second embodiment of the present invention.

Next, a second embodiment of the present invention is explained below. As for the constitution of the present embodiment, a similar one as used in the first embodiment is used. Corresponding parts and components to the first embodiment are shown by the same numerals and marks, and the description thereon made in the first embodiment similarly apply. Differences and features of this second embodiment from the first embodiment are as follows. In this second embodiment, the input-output characteristic of a nonlinear conversion means 7 is determined in a manner that, when the absolute value of the input is less than a specified threshold value (TH1) as shown in FIG. 7, the output is zero or substantially zero; and on the other hand when the absolute value of the input is greater than the threshold value (TH1), the input-output characteristic becomes a monotonously increasing function and an increase of its slope, at least, does not become negative.

That is, $$\left.\begin{array}{l}\text{(a) when } |Si| \leq TH1, ki = 0, . \\ \text{(b) when } TH1 < |Si| \leq TH2, ki = \alpha 1 Si + \alpha 2, \\ \text{(c) when } TH2 < |Si| \leq TH3, ki = \beta 1 Si + \beta 2, \\ \text{(b) when } TH3 < |Si|, ki = \gamma 1 Si + \gamma 2, \end{array}\right\} \quad (4)$$

where $\beta$ and $\tau$ are constants.

Since the operation of the second embodiment of the present invention is the same as the first embodiment, explanation is given only on the correction by the input-output characteristic of the nonlinear scheme by the conversion means 7 described above.

It is commonly the case that those components of relatively low levels among the high-frequency range components of a picture image signal are mostly noise. Therefore, in case that the absolute value of the arithmetic processed result of the relevant pixel and the reference pixels is less than a specified value TH1, the output of the nonlinear conversion means 7 becomes zero.

And, when the absolute value of the arithmetic processed result of the relevant pixel and the reference pixels is greater than a specified value TH1, the output of the nonlinear conversion means 7 becomes a monotonously increasing function which is continuous from zero as shown by the inequity (4). Accordingly the correction value thereof keeps its increase.

Figure 8:
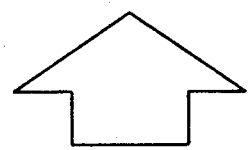
FIGS. 8a and 8b are an example of explanatory table of results processed by the second embodiment of the present invention.

FIG. 8 shows an example of the result processed in accordance with the present embodiment using the nonlinear conversion means 7 having the input-output characteristic as shown in FIG. 7.

In FIG. 8, (a) illustrates picture image data before the correction, (b) picture image data after the correction, as mentioned before. Here, the input-output characteristic of the nonlinear conversion means 7 is assumed to be, when $Si \leq -30$, $ki = 0.125 \times Si$, when $-30 < Si < -15$, $ki = 0.25 \times 1Si + 3.75$, when $|Si| \leq 15$, $ki = 0$, when $15 < Si \leq 30$, $ki = 0.25 \times 1Si - 3.75$ and when $30 < Si$ $ki = 0.125 \times Si$.

And, FIG. 9 shows an example of the result processed by means of conventional scheme, that is by the same scheme as in FIG. 6. Here, in order to keep the condition to be identical with the present embodiment, $|TH| = 120$ and $\alpha = 0.125$ are assumed. Comparison between FIG. 8 and FIG. 9 reveals the followings: When the level variation on a contour line is gradual, according to the conventional scheme, as shown in FIG. 9, the correction operation is terminated at the pixel at which the level is 210, after a certain midway of the contour line (In FIG. 9(b)). On the other hand, according to the present invention, as shown in FIG. 8, even when the level variation on a contour line is gradual as shown in FIG. 8, it can be seen that the correction operation continues until the original contour line stops.

As has been described above, according to the second embodiment of the present invention, in the picture image signal, low-level data of high-frequency range of the noise components in the flat portions of the density variation are not enhanced. And the slope of the density variation changes continuously. Therefore, undesirable interruption of contour lines of gradual level change can be avoided, thereby stable contour lines are realized.

Apart from the present embodiment, wherein the input-output characteristic is taken as a combination of 1-st order functions, other modification of other order functions may be used such that: for an amount of the MTF correction, when the slope of the absolute value of the input increases, the slope of the input-output characteristic, at least, does not become negative. For example, a 2-nd order function can also be used.

THIRD EMBODIMENT

Figure 10:
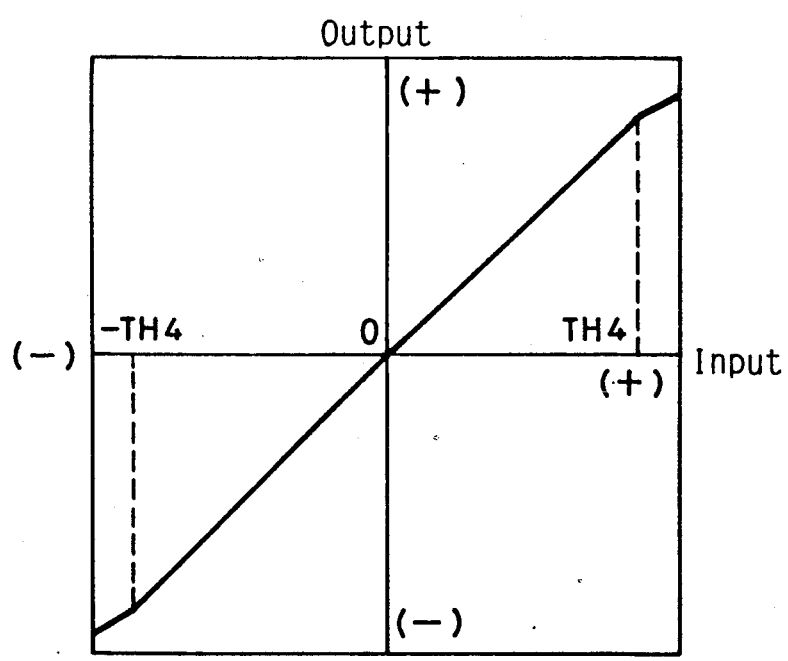
FIG. 10 is an input-output characteristic of a nonlinear conversion means in a third embodiment of the present invention.

Next, a third embodiment of the present invention is explained below. As for the constitution of the present embodiment, a similar one as used in the first embodiment is used. Corresponding parts and components to the first embodiment are shown by the same numerals and marks, and the description thereon made in the first embodiment similarly apply. Differences and features of this third embodiment from the first embodiment are as follows. In this third embodiment, the input-output characteristic of a nonlinear conversion means 7 is determined to be continuous, and that when the absolute value of input is greater than a second threshold value (TH4) which is greater than the first threshold value (TH1), its slope is taken to be smaller than a maximum slope in a range in which the absolute value of the input is less than the second threshold value (TH4). This input-output characteristic is shown in FIG. 10.

Namely, letting the result of this arithmetic processing to be S(i), it is expressed as $$\left.\begin{array}{l}\text{(a) when } |Si| \leq TH4, ki = \alpha \cdot Si, \\ \text{(b) when } TH4 < |Si|, ki = \beta \cdot Si + \gamma. \\ \text{(where } 0 < \beta < \alpha) \end{array}\right\} \quad (5)$$

Since the operation of the third embodiment of the present invention is similar to that of the first embodiment, explanation is given only on the correction scheme by the input-output characteristic of the nonlinear conversion means 7 described above.

In the input-output characteristic of the nonlinear conversion means, when the absolute value of input is greater than a second threshold value (TH4), its slope is smaller than a maximum slope in a range in which the absolute value of the input is less than the second threshold value (TH4). Accordingly, when the absolute value of the subtracted result between the relevant pixel and the reference pixels is greater than the second threshold value, that is, when the absolute value of the subtracted result between the relevant pixel and the reference pixels is larger than a certain value, it means that the level difference between adjacent pixels before the correction is large. For such cases, the degree of contour enhancement by the MTF correction weakened.

In FIG. 11, an example of the processed result in accordance with the present embodiment using the nonlinear conversion means 7 having the input-output characteristic as shown in FIG. 10 is shown.

In FIG. 11, (a) illustrates picture image data before the correction, (b) picture image data after the correction, as mentioned before. Here, the input-output characteristic of the nonlinear conversion means 7 is assumed to be, $$\left.\begin{array}{l} \text{when } Si \leq -140, ki = 0.0625 \times Si - 8.75, \\ \text{when } |Si| \leq 140, ki = 0.125 \times Si, \text{ and} \\ \text{when } 140 < Si, ki = 0.0625 \times 1Si + 3.75. \end{array}\right\} \quad (6)$$

And, an example of the processed result by means of conventional scheme, that is by the same scheme as in FIG. 6 is shown in in FIG. 12.

Comparison between FIG. 11 and FIG. 12 reveals the followings: According to the conventional scheme, when the difference between the level of the contour line and the white flat area is large, as shown in FIG. 12, boundary area adjacent to the contour line is corrected exaggeratedly. On the other hand, according to the present invention, as shown in FIG. 11, there is no such exaggerated correction in the boundary area adjacent to the contour line.

FOURTH EMBODIMENT

Figure 13:
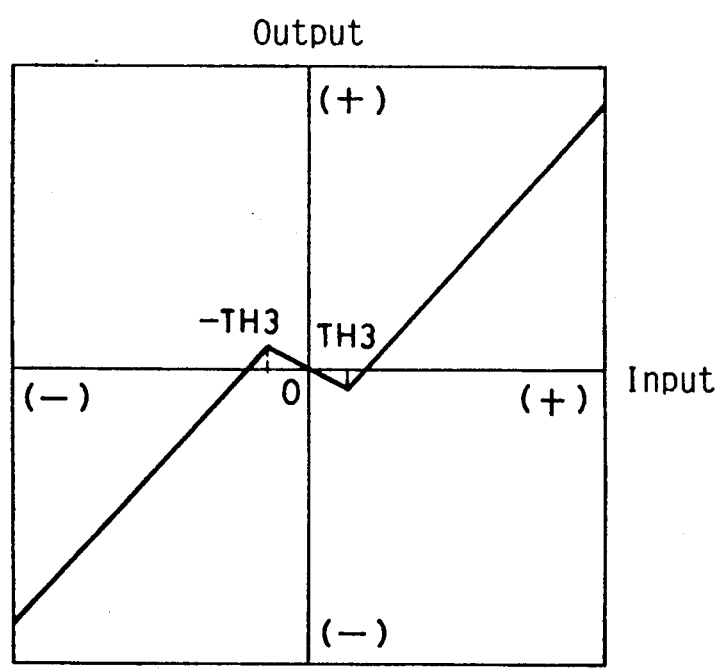
FIG. 13 is an input-output characteristic of a nonlinear conversion means in a fourth embodiment of the present invention.

Next, a fourth embodiment of the present invention is explained below. As for the constitution of the present embodiment, a similar one as used in the first embodiment is also used. Corresponding parts and components to the first embodiment are shown by the same numerals and marks, and the description thereon made in the first embodiment similarly apply. Differences and features of this fourth embodiment from the first embodiment are as follows. In this fourth embodiment, the input-output characteristics of a nonlinear conversion means 7, however, is determined in a manner to be continuous, and that when the absolute value of input is less than the first threshold value (TH1) it is taken to be one expressed by a monotonously decreasing function. This input-output characteristic is shown in FIG. 13.

The input-output characteristic of the present embodiment is expressed as, $$\left.\begin{array}{l} \text{(a) when } |Si| \leq TH3, ki = \alpha \cdot Si, \\ \text{(b) when } TH4 < |Si|, ki = \beta \cdot Si + \gamma. \\ \text{(where } \alpha < 0 < \beta) \end{array}\right\} \quad (7)$$

Since the operation of the fourth embodiment of the present invention is also the same as the first embodiment, explanation is given only on the correction scheme by the input-output characteristic of the nonlinear conversion means 7 described above.

In the fourth embodiment, in case that the absolute value of the input is less than the first threshold value (TH3), a smooth-out processing is carried out.

This means that, when $|Si| \leq TH3$, by letting ki be replaced by $ki = \epsilon \cdot Si$ ($0 < \gamma$), the equation (2) becomes as follows when $|Si| \leq TH3$:

$$\left.\begin{array}{l} D'(i,j) = D(i,j) + S'(i,j) \\ = (1 - 4\epsilon)D(i,j) + \epsilon \{D(1-i,j) + \\ D(i+1,j)\} + D(i,j-1) + \\ D(i,j-1)\}, \end{array}\right\} \quad (8)$$

Thus it is understood that this spatial filter acts as a low-pass filter.

FIG. 14 shows an example of the result processed in accordance with the present embodiment using the nonlinear conversion means 7 having the input-output characteristic as shown in FIG. 13.

In FIG. 14, (a) illustrates picture image data before the correction, (b) picture image data after the correction. Here, the input-output characteristic of the nonlinear conversion means 7 is assumed to be, when $Si \leq -15$, $ki = 0.125 \times Si + 3.75$, when $|Si| \leq 15$, $ki = 0.125 \times Si$ and when $15 < Si$, $ki = 0.125 \times 1Si - 3.75$.

Figure 15:
FIGS. 15a and 15b show an example of explanatory tables of data corresponding to those of FIG. 14 but processed by the prior art.

And, an example of the result processed by means of conventional scheme, that is by the same scheme as in FIG. 6 is shown in in FIG. 15.

Comparison between FIG. 14 and FIG. 15 reveals the following: According to the conventional scheme, when the difference between the level of the contour line and the white flat area is large, as shown in FIG. 15, noises are left as before correction and they were issued without any correction. On the other hand, according to the present invention, as shown in FIG. 14, noises are smoothed out; thereby suppressing the noise of the picture image.

As has been described above, according to the fourth embodiment, there is a smoothing out of the low-level noise components of high frequency range by a spatial filter. Thus it becomes possible to obtain a picture image without the granularities due to noise, and only the contour lines are enhanced.

And, it is obvious that, by combining the second and third, and third and fourth embodiments, the advantages of the embodiments can be enhanced greatly.

Figure 16:
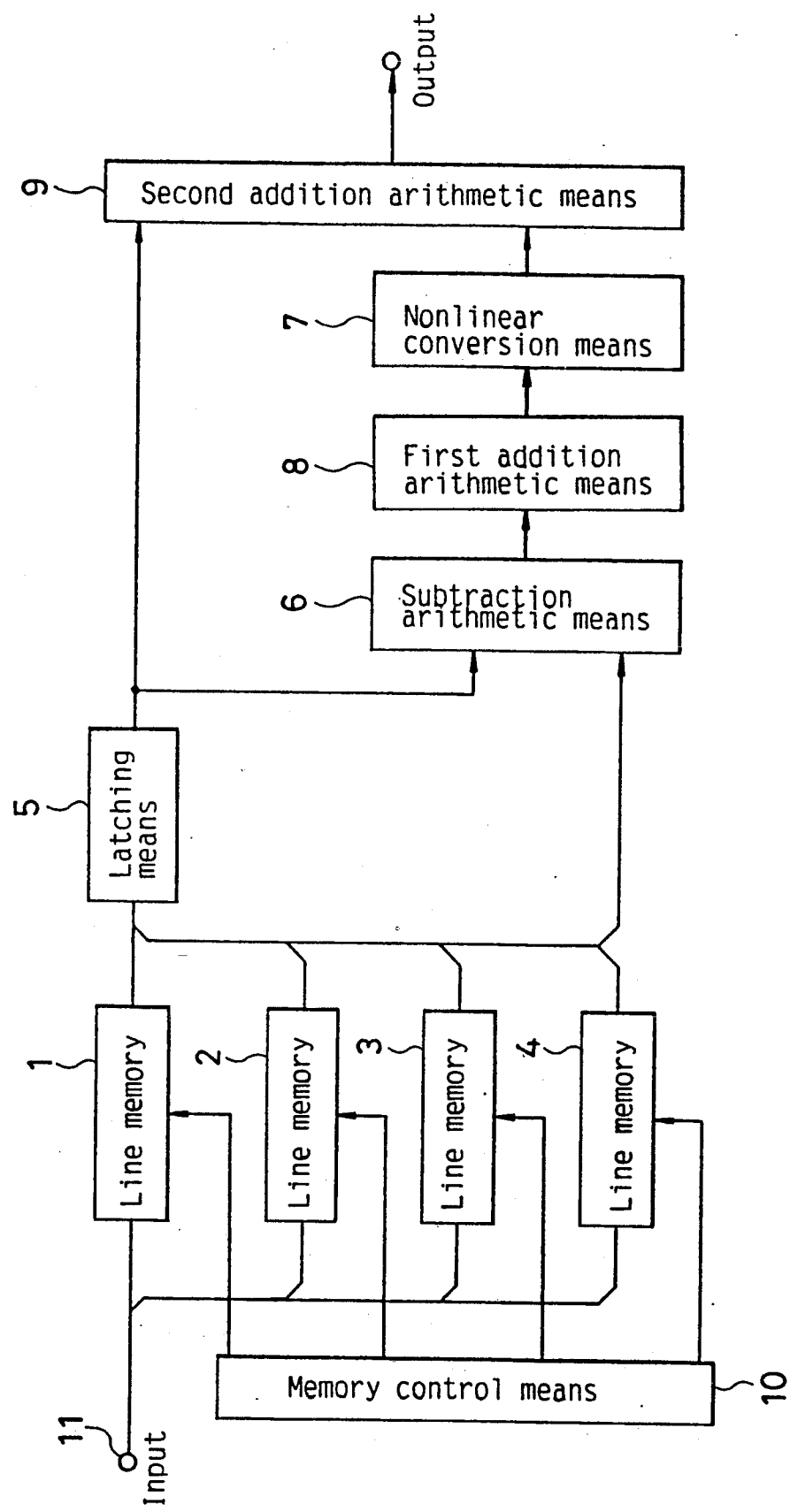
FIG. 16 is a block diagram of one example of a second logic processing apparatus in a second embodiment circuit configuration.

Also, other modified modes other than the constitutions that have been described in the second, third, and fourth embodiments may be similarly used. For example, as a fifth embodiment, there is a modified constitution as shown in FIG. 16 such that: obtaining first, the difference between the relevant pixel and a sum of nearest-neighboring pixels, that is, obtaining in advance the Laplacian component of second order derivative by arithmetic means 6 and 8; the result thereof is then nonlinearly converted by the nonlinear conversion means 7 having the input-output characteristic such as that explained in the foregoing embodiments; and thereafter the resultant converted data is added to the data of relevant pixel. By this modified constitution, too, similar effects as described above is obtainable.

Although only one embodiment of the invention has been disclosed and described, it is apparent that other embodiments and modification of the invention are possible.

What is claimed is:

1. A picture processing apparatus for sharpening a picture image in which a plurality of line memories each store a line of a picture image signal and a latching means stores a relevant pixel in said line memories, said picture processing apparatus comprising:

subtraction means for subtracting from a datum of said relevant pixel, N (N≧=1) respective data of N pixels which are nearest neighbors of said relevant pixel to produce N subtraction outputs;

nonlinear conversion means for nonlinearly converting said N subtraction outputs to produce N corresponding conversion outputs;

first addition means for adding said N conversion outputs to produce a conversion sum; and second addition means for adding said datum of said relevant pixel and said conversion sum to produce a sharper image pixel.

2. An apparatus according to claim 1, wherein said nonlinear conversion means:

outputs a conversion output substantially equal to zero when an absolute value of a corresponding subtraction output is less than or equal to a first threshold value; and outputs a conversion output based on a first positively sloped linear function of a corresponding subtraction output when an absolute value of said subtraction output is greater than said first threshold value.

3. An apparatus according to claim 2, wherein said nonlinear conversion means outputs a conversion output based on a second positively sloped linear function of a corresponding subtraction output when an absolute value of said subtraction output is greater than a second threshold value, said second threshold value being greater than said first threshold value and said second positively sloped linear function having a slope greater than said first positively sloped linear function.

4. An apparatus according to claim 3, wherein said nonlinear conversion means outputs a conversion output based on a third positively sloped linear function of a corresponding subtraction output when an absolute value of said subtraction output is greater than a third threshold value, said third threshold value being greater than said second threshold value and said third positively sloped linear function having a slope greater than said second positively sloped linear function.

5. An apparatus according to claim 1, wherein said nonlinear conversion means outputs a conversion output based on a first positively sloped linear function of a corresponding subtraction output.

6. An apparatus according to claim 5, wherein said nonlinear conversion means outputs a conversion output based on a second positively sloped linear function of a corresponding subtraction output when an absolute value of said subtraction output is greater than a first threshold value, said second positively sloped linear function having a slope less than said first positively sloped linear function.

7. An apparatus according to claim 1, wherein said nonlinear conversion means outputs a conversion output based on a negatively sloped linear function of a corresponding subtraction output.

8. An apparatus according to claim 7, wherein said nonlinear conversion means outputs a conversion output based on a positively sloped linear function of a corresponding subtraction output when an absolute value of said subtraction output is greater than a first threshold value.

9. An apparatus according to claim 1, wherein said nonlinear conversion means:

outputs a conversion output substantially equal to zero when an absolute value of a corresponding subtraction output is less than or equal to a first threshold value;

outputs a conversion output based on a first positively sloped linear function of a corresponding subtraction output when an absolute value of said subtraction output is greater than said first threshold value;

outputs a conversion output based on a second positively sloped linear function of a corresponding subtraction output when an absolute value of said subtraction output is greater than a second threshold value, said second threshold value greater than said first threshold value and said second positively sloped linear function having a slope greater than said first positively sloped linear function; and outputs a conversion output based on a third positively sloped linear function of a corresponding subtraction output when an absolute value of said subtraction output is greater than a third threshold value, said third threshold value greater than said second threshold value and said third positively sloped linear function having a slope greater than said second positively sloped linear function.

10. A picture processing apparatus for sharpening a picture image comprising:

a plurality of line memories each for storing a line of a picture image signal;

latching means for storing a relevant pixel in said line memories;

subtraction means for subtracting from a datum of said relevant pixel, N (N≧1) respective data of N pixels which are nearest neighbors of said relevant pixel to produce N subtraction outputs;

nonlinear conversion means for nonlinearly converting said N subtraction outputs to produce N corresponding conversion outputs;

first addition means for adding said N conversion outputs to produce a conversion sum; and second addition means for adding said datum of said relevant pixel and said conversion sum to produce a sharper image pixel.

11. A picture processing apparatus for sharpening a picture image comprising:

a plurality of line memories each for storing a line of a picture image signal;

latching means for storing a relevant pixel in said line memories;

substraction means for subtracting from a datum of said relevant pixel, N (N≧1) respective data of N pixels which are nearest neighbors of said relevant pixel to produce N subtraction outputs;

first addition means for adding said N subtraction outputs to produce a conversion sum;

nonlinear conversion means for nonlinearly converting said conversion sum to produce a corresponding conversion output; and second addition means for adding said datum of said relevant pixel and said conversion output to produce a sharper image pixel.

\* \* \* \* \*

UNITED STATES PATENT AND TRADEMARK OFFICE
CERTIFICATE OF CORRECTION

PATENT NO. : 5,144,686

DATED : September 1, 1992

INVENTOR(S) : Takashi YUMIBA, et al.

It is certified that error appears in the above-identified patent and that said Letters Patent is hereby corrected as shown below:

On the Title page:

The first line after item [19], the inventor's name should read

-- Yumiba et al. -- and again at item [75] Inventors: the first named inventor should read

-- Takashi Yumiba --

Signed and Sealed this

Fifteenth Day of March, 1994

Attest:

BRUCE LEHMAN

Attesting Officer

Commissioner of Patents and Trademarks